United States Patent [19]

Collins

[11] Patent Number: 4,627,655
[45] Date of Patent: Dec. 9, 1986

[54] PICK-UP CAP CONSTRUCTION
[75] Inventor: John Collins, Elkhart, Ind.
[73] Assignee: Leer, Incorporated, Elkhart, Ind.
[21] Appl. No.: 460,034
[22] Filed: Jan. 21, 1983
[51] Int. Cl.[4] .......................... B60P 3/32; B62D 27/00
[52] U.S. Cl. .................................. 296/167; 296/31 P;
296/35.1; 296/135; 296/5 G; 296/106;
296/166; 296/164; 403/287
[58] Field of Search .................. 296/29, 35.1, 35.3,
296/10, 156, 164, 166, 167, 31 P, 56, 106, 76,
135; 52/584; 403/287; 49/495, 498

[56] References Cited
U.S. PATENT DOCUMENTS

| | | | |
|---|---|---|---|
| 2,559,029 | 7/1951 | Randolph | 296/164 |
| 2,705,655 | 4/1955 | Brown et al. | 49/498 |
| 2,910,209 | 10/1959 | Nelson | 49/495 |
| 3,390,913 | 7/1968 | Hunter | 296/10 |
| 3,414,317 | 12/1968 | Mortimer | 49/498 |
| 3,540,772 | 11/1970 | Weiler | 296/167 |
| 3,612,601 | 10/1971 | Himka et al. | 296/106 |
| 3,741,605 | 6/1973 | Lee | 296/10 |
| 3,857,601 | 12/1974 | Robbins | 296/10 |
| 3,926,469 | 12/1975 | Ulics | 296/167 |
| 3,953,066 | 4/1976 | Hamilton | 296/160 |
| 4,123,099 | 10/1978 | Mashigan | 296/10 |
| 4,255,903 | 3/1981 | Reynolds et al. | 49/498 |
| 4,258,950 | 3/1981 | Itoh et al. | 296/106 |
| 4,315,653 | 2/1982 | Sparling | 296/156 |
| 4,341,414 | 7/1982 | Chiba | 296/56 |

OTHER PUBLICATIONS

*Commercial Motor*, Aug. 28, 1982, Sherpa Advertisement.

Primary Examiner—Robert B. Reeves
Assistant Examiner—Dennis H. Pedder
Attorney, Agent, or Firm—Barnes & Thornburg

[57] ABSTRACT

A pick-up cap construction is provided which includes a novel compressible seal arrangement between the pick-up driver cab and the pick-up cap, a novel rear door construction and a novel pick-up cap holddown arrangement. The rear door construction includes a full size rear door covering the complete area from the top of the pick-up cap to the truck bed, pivoted about a horizontally extending axis disposed at the top of the pick-up cap. The pick-up cap sidewalls are attached to the pick-up truck box sidewalls by means of an extruded metal mounting rail which forms one side of a sandwich clamp construction engageable with the lower part of the cap sidewall, and which is riveted to another extruded metal profile part which serves the additional function of accommodating a mounting of a decorative profile strip to cover the connection between the cap and truck box sidewalls.

11 Claims, 11 Drawing Figures

FIG. 9.
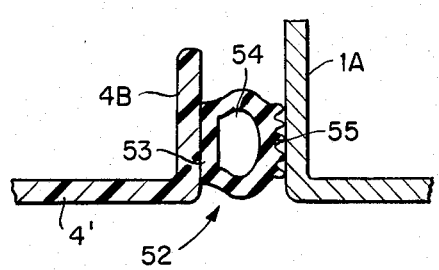
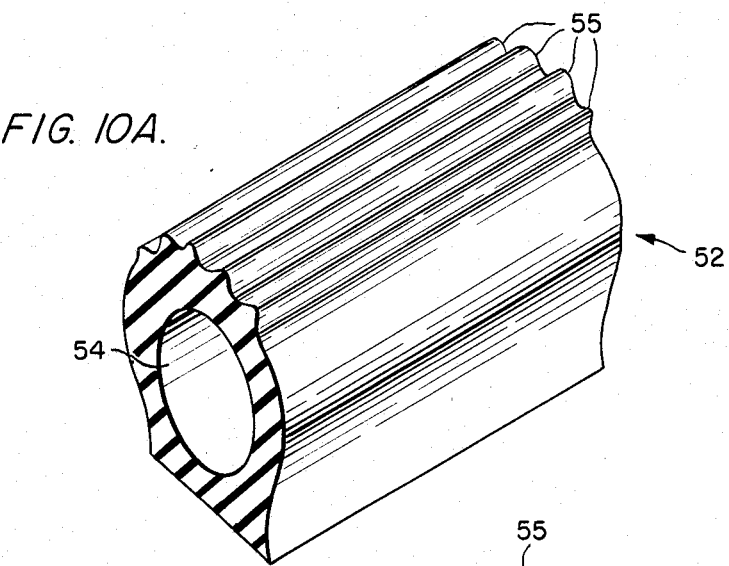
FIG. 10A.
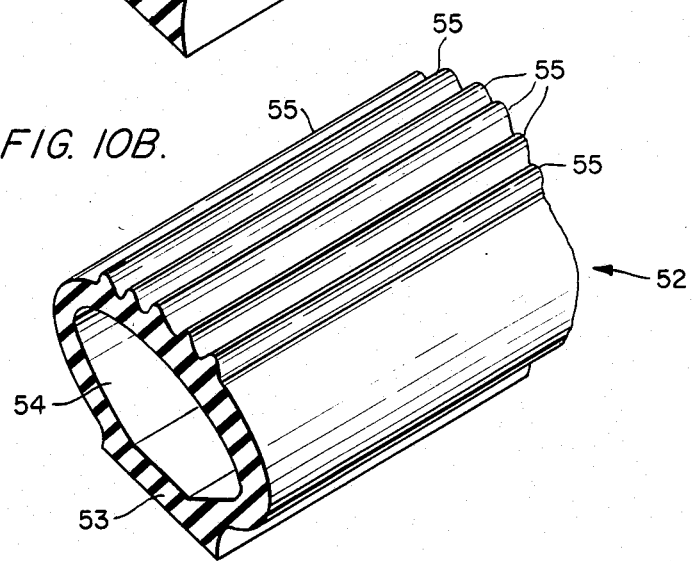
FIG. 10B.

PICK-UP CAP CONSTRUCTION

BACKGROUND AND SUMMARY OF THE INVENTION

The present invention relates to pick-up caps which are mountable on pick-up truck boxes and serve to provide an enclosure for passengers and articles to be carried. More specifically, the present invention relates to an improved pick-up cap construction which includes a fiberglass reinforced plastic molded shell body having a top and downwardly protruding sidewalls. The present invention is particularly directed to improving three aspects of such pick-up cap constructions, namely:

(i) the arrangement for attaching the pick-up cap sidewalls to the pick-up truck box sidewalls;

(ii) the construction of the opening and access door at the rear of the truck body; and (iii) the sealing connection between the front open end of the pick-up cap and the rear of a pick-up driver cab.

Various types of holddown devices have been proposed for holding pick-up caps on the pick-up box sidewalls, as exemplified by U.S. Pat. No. 3,356,408 to Stutz; U.S. Pat. No. 3,455,573 to Magers; U.S. Pat. No. 3,475,049 to Overhulser; U.S. Pat. No. 3,536,352 to Beckley; U.S. Pat. No. 3,540,772 to Weiler; U.S. Pat. No. 3,857,601 to Robbins; and U.S. Pat. No. 4,231,610 to Stoll. However, prior contemplated arrangements have not been satisfactory in all respects as to the appearance of the assembled pick-up cap and pick-up truck body, the ease of assembling the pick-up cap, the manufacturing cost for the connection assembly, the durability and reliability of the pick-up cap so as to accommodate multiple attachment and detachment, as well as the forces experienced during in-use, on road conditions. Further, such prior constructions have not been entirely satisfactory in obtaining a sufficiently firm and durable connection of the pick-up cap and the pick-up truck sidewalls so as to facilitate and maintain a firm sealing of the pick-up cap forward end against the rear of the pick-up driver cab.

According to one aspect of the invention, these problems of holding down the sidewalls of the pick-up cap are solved by providing a holddown arrangement which includes an extruded metal rail having a base portion which lays over the top of the sidewall of the pickup box and a generally vertical portion which engages underneath and along the side of the lower portion of the pick-up cap sidewall. A second extruded metal part rail is disposed along the outside of the bottom of the pick-up cap sidewall which also includes a lower support portion in facing engagement with the mounting rail. Rivet or the like connecting means extend through the two extruded rails and the lower portion of the fiberglass shell body sidewalls to clamp the assembly together. The outer extruded rail includes a profile shape for accommodating the application of a further extruded plastic decorative strip which covers-up the connection between the sidewalls and provides for a very neat overall appearance of the pick-up truck and cap combination while also protecting the sidewalls against lateral bumps and the like. With this arrangement it is especially advantageous that a single extruded metal part serves to form one half of the rigid supporting clamp for the lower portion of the sidewalls, as well as serving to accommodate the decorative strip means. This construction, with extruded metal parts sandwichingly engaging and supporting from underneath the pick-up cap sidewalls, makes it possible to very rigidly clamp the pick-up cap to the pick-up box sidewall, thereby assuring maintenance of the compression seal between the front of the pick-up cap and the rear of the driver cab.

There have also been many rear door configurations proposed for pick-up caps of the type contemplated by the present invention. Most of these rear door configurations utilize the tail gate of the pick-up box as the lower portion of the door. However, there have been proposals for rear door constructions which extend from the pick-up cap downwardly to the pick-up truck box floor, as exemplified by U.S. Pat. No. 4,123,099 to Mashingan. This last mentioned construction includes two doors arranged laterally beside one another, supported at respective vertically extended hinge posts protruding downwardly from the pick-up cap. The two-part door construction is relatively complex to construct and close manufacturing tolerances must be held to assure a good fit, which sometimes is not so easy to do with fiberglass molded shell bodies of the type under consideration. Furthermore, this last mentioned construction, with the requirement of hinge connections at both lateral sides of the rear opening, means that some lateral space in the lower region of the box is occupied by the hinge construction and support, thereby making the lateral width of the opening into the pick-up box narrower than the normal separation distance of the sidewalls of the pick-up box.

According to a further aspect of the present invention, a rear-door construction is provided for a pick-up cap which overcomes the above-noted disadvantages of the prior art arrangements. According to particularly preferred embodiments of the invention, the rear door is constructed as a single molded fiberglass reinforced plastic door which is supported by hinges extending horizontally along the top of the pick-up cap shell body. The rear door is configured to overlap and abuttingly engage with seal means provided at the lateral edges of the pick-up box opening and the pick-up shell rear opening, so that maximum access from the rear is easily provided. Furthermore, a rigid and durable support of the rear door is provided by means of metal extrusions and frame members disposed around the top of the pick-up cap shell body and top of rear door, which must be provided in any event with support for the roof portion so that additional materials and construction costs are minimized, while still obtaining the benefit of a single large fully openable rear door.

According to particularly preferred embodiments, the rear door construction includes a profile member along the outside thereof corresponding to the profile for the protective decorative strip of the sidewalls, such that a protective strip can also be provided at the rear door which conforms with the sidewall protective strip and protective moldings, again providing for a very economical and pleasant appearing overall construction. According to especially preferred embodiments, the extruded metal profile member which serves for holding the decorative strip across the rear door, also serves for the mounting of the handle and latching mechanism. In this way, a minimal number of constructional parts and construction steps are required for manufacturing the pick-up cap arrangement.

There have been previously proposed sealing arrangements between the front of pick-up cap shell bodies and the like and the rear of a pick-up driver cap, such as exemplified by U.S. Pat. No. 3,840,266 to Carlson and U.S Pat. No 3,897,100 to Gardner. However, with the elastic seal of the above-noted Carlson '266 patent there are disadvantages in that the use of adhesive limits the number of changes that can be made and it is in any event required that tne pick-up cap be compressively pushed against the seal. The mechanisms of the Carlson '266 patent fail in practice to adequately provide such a compression connection. According to the Gardner '100 patent, there is a bulk-head provided which has a detachable latch to accommodate quick attachment and detachment of the slidable rail mounted pick-up cap shell body. In Gardner, there is a seal provided between the pick-up cap and the bulkhead, however the fixed position latching of the pick-up cap at the bulkhead limits the possibilities for the application of the compressive force against the seal.

U.S. Pat. No. 4,157,201, assigned to the assignee of the present application, discloses a double sealing arrangement, including an access door between the pick-up cap and the driver cab. Although this arrangement works very well in practice and is very advantageous when one utilizes an access door extending from the bottom of the pick-up door box, it is not optimally applicable to instances where a simple open-ended shell body is to be used which engages against the rear of the driver cab.

According to a further aspect of the invention, a fluid and air tight compression sealed construction is provided between the forward open end of the pick-up shell body and the rear of the pick-up driver cab, which compression seal arrangement is especially advantageous when used in conjunction with the above-mentioned novel holddown mechanism of the present invention, assuring maintenance of a tight compression fit.

These and further objects, features and advantages of the present invention will become more obvious from the following description when taken in connection with the accompanying drawings which show, for purposes of illustration only, several embodiments in accordance with the present invention.

BRIEF DESCRIPTION OF THE DRAWINGS

FIG. 9 is a partial sectional view taken along line IX—IX of FIG. 8;

FIG. 10A is an enlarged perspective sectional view showing a compression seal in an uncompressed condition; and FIG. 10B is a view similiar to the view in FIG. 10A but showing a compression seal in accordance with the present invention in an in-use compressed condition.

DETAILED DESCRIPTION OF THE DRAWINGS

Figure 1:
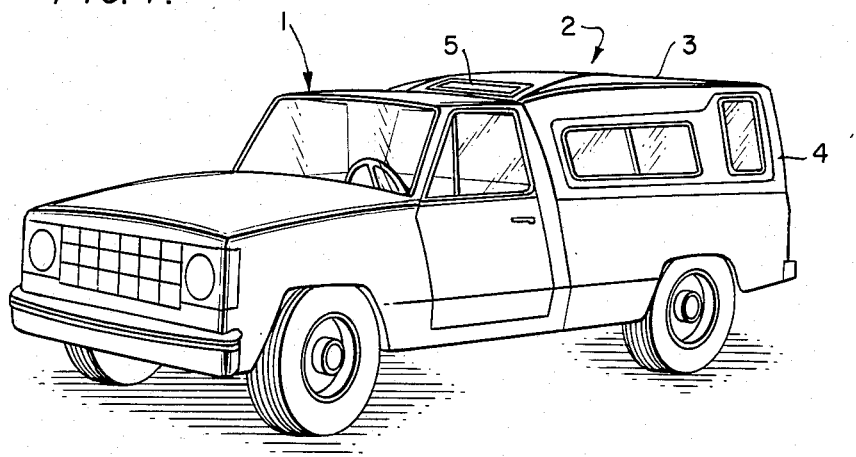
FIG. 1 is a perspective front side view of a pick-up and pick-up cap construction made in accordance with a preferred embodiment of the present invention.
Figure 2:
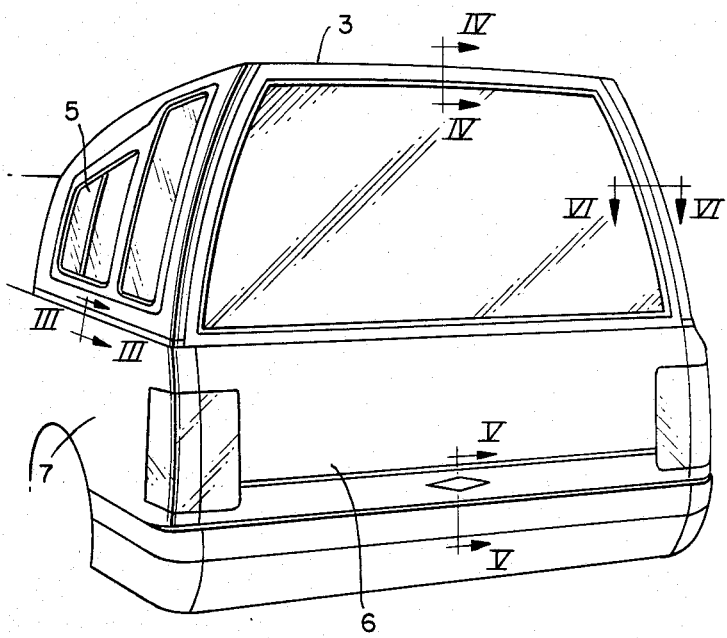
FIG. 2 is a partial rear perspective view of the pick-up and pick-up cap construction of FIG. 1.

Referring to FIG. 1, there is shown a pick-up 1 with a pick-up cap 2 mounted thereon. The pick-up cap 2 exhibits a top 3 and sidewalls 4 and 4', molded as a unit from fiberglass reinforced plastic. Window accommodating sections 5 are provided in the sidewalls, and also preferably at a position in the forward end adjacent the top of the pick-up cab. The forward end of the pick-up cap shell body 2, as best shown if FIG. 7, is formed to be substantially completely open in the forward direction. The rear of the shell body 2 is also substantially completely open, and is covered by a rear door 6 hingedly mounted at the top part of the cap shell body, as explained in more detail in connection with FIGS. 4–6.

Figure 3:
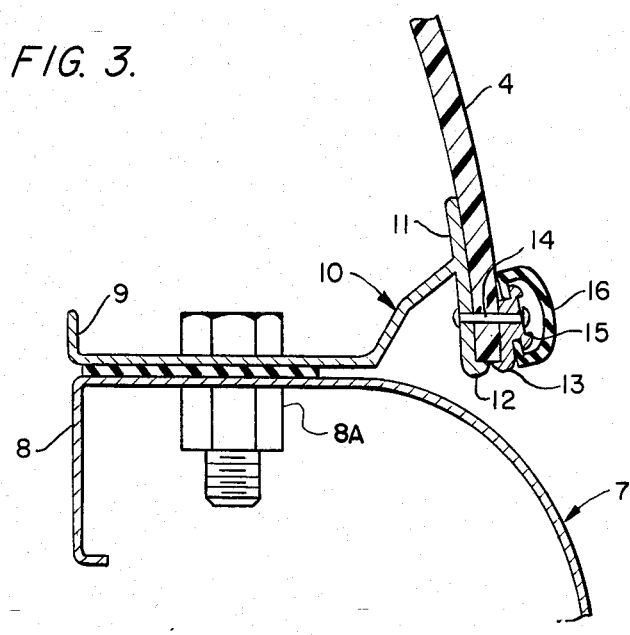
FIG. 3 is a sectional view taken along line III—III of FIG. 2, showing the holddown connection of the cap sidewalls at the pick-up truck box sidewalls.

The pick-up cap 2 is vertically supported at the pick-up truck box sidewalls 7 by means of the hold-down means 8A best illustrated in FIG. 3. The pick-up box sidewalls 7 include an inwardly protruding top flange 8. In the pick-up cap assembled condition as shown in FIG. 3, a base member portion 9 of a unitary extruded metal profile member 10 rests on the pick-up box sidewall flange 8, and is detachably attached thereto by means of hold-down bolts 8A or the like.

This unitary mounting rail profile member 10 includes an upwardly extending portion 11 which is engagable with the inside of the lower portion of the sidewall 4 of the fiberglass molded shell body 4. This profile portion 11 leads into a part 12 which engages underneath the bottom edge of the side 4. In facing relationship to the mounting rail member 10 there is provided another extruded metal rail 13, which has an upward facing portion which engages underneath the bottom edge of the sidewall 4 and extends vertically along the outer side of the sidewall. Rivet means 14 extend through the member 13 and the portion 11 of the profile member 10 to rigidly and securely clamp the fiberglass sidewall 4 to the member 10. In especially preferred embodiments, the profile member parts 13 and 10 are riveted together at intervals of 4 to 6 inches.

The profile member 13 forming the outer side of the clamping connection for the lower part of the sidewall 4 is provided with a raised configuration profile portion 15 for accommodating application of a decorative trim member. A protective decorative trim member 16, preferably of extruded longitudinally extending plastic, is shown slid over and held by the trim holding means 15. This decorative trim member 16 can be easily applied after the members 10 and 13 have been riveted together with the sidewalls of the shell body, and serves to cover-up the riveting connections, and can also serve to conceal in a decorative manner the entire joint connection as seen from the side, for the joint between the pick-up cap and the pick-up truck box sidewalls 7. Additionally, the mounting rail member 10 (also referred to as a unitary extruded metal profile member) may advantageously be configured to conceal the riveting connections from an individual viewing the inside of the pick-up truck box with attached cap.

Figure 4:
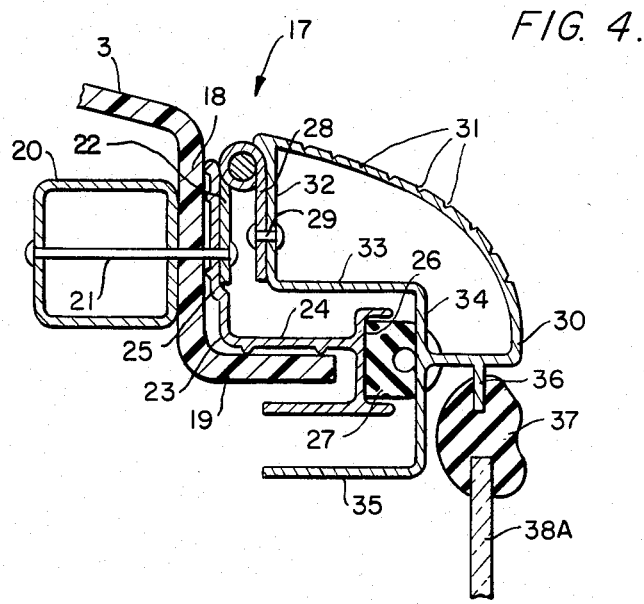
FIG. 4 is a part sectional view taken along lines IV—IV of FIG. 2, and showing details of the upper hinge connection of the rear door of the pick-up cab construction of the present invention.

The rear door 6 is hingedly supported at the top 3 of the fiberglass shell body by means of a hinge arrangement generally designated by reference character 17 (see FIG. 4). Door 6 effectively closes a rearwardly facing rear opening extending substantially over the entire width and height of the shell body. The upper rear part of the fiberglass shell body 3 includes a vertically extending portion 18, which leads into a horizontally extending portion 19, these portions 18 and 19 being molded together with the shell body when it is formed. A metal square reinforcing tube 20 extends laterally along the top part of the shell body and serves as a support and connecting base for rivets 21 clampingly connecting one leg 22 of the hinge to the fiberglass wall part 18 and the support frame 20. Interposed between the leg 22 of the hinge and the fiberglass shell body is a further profile member 23 which rests with its horizontally extending portion 24 on part 19 of the fiberglass shell and which is sandwiched between the leg 22 and the vertically extending part 18 at its vertically extending part 25. This profile member 23, preferably of extruded aluminum, also exhibits a seal holding portion 26, for accommodating a door closing seal 27, which seal 27 is fixedly attached, as by adhesive, to the profile member 23.

The movable leg 28 of the hinge 17 is fixed by rivets 29 to a further closed extruded profile aluminum member 30. Member 30 includes decorative indentations 31 along the outer curved surface therof conforming to an extension of the roof line of the top 3 of the shell body. Extrusion 30 is connected along vertically extending part 32 by the rivets 29, which part 32 is then joined by horizontally extending part 33 continuing on downwardly along part 34 to part 35 to form a U-shaped inwardly facing abutment which engages against the outer surface of the elastic seal member 27 when the rear door is in a closed position. The extrusion 30 has a downwardly protruding portion 36, serving to support an elastic profile seal support 37 for rear window glass Plate 38A.

Figure 5:
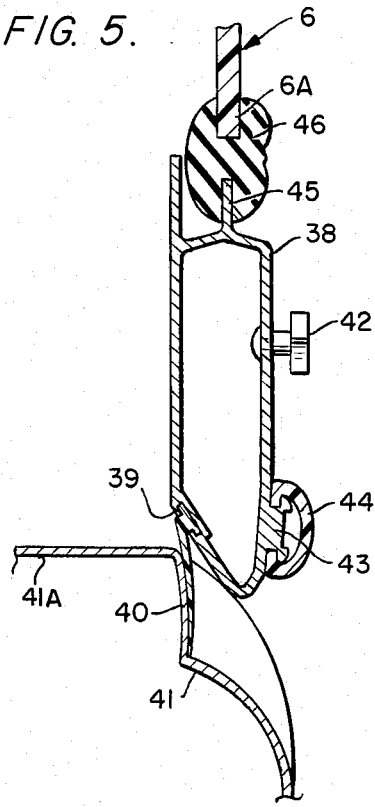
FIG. 5 is a sectional view taken along line V—V of FIG. 2 and showing details of the lower part of the rear door construction of the present invention.

FIG. 5 shows the lower part of the rear door assembly 6. A further extruded aluminum closed profile member 38 extends horizontally along the bottom of the door and includes a profile cut-out shape 39 for accommodating a vinyl flap seal 40, which seal 40 engages against the lower part of the pick-up truck rear portion 41 below the level of the floor 41A of the pickup box where the rear door 6 is in a latched position. Profile member 38 serves further for supporting the rear door handle 42, which is attached by a riveting connection at the rear of the member 38. At the lower portion of the profile member 38, trim holder member 43 corresponding to the shape of trim holding means 15 of the member 13, is provided for accommodating a decorative profile strip 44 placed at the height of the sidewall decorative trim memer 16. The profile member 38 also includes an upwardly extending protrusion 45 which engages with an elastic sealing connection 46 which holds the lower edge 6A of the fiberglass rear door 6.

Figure 6:
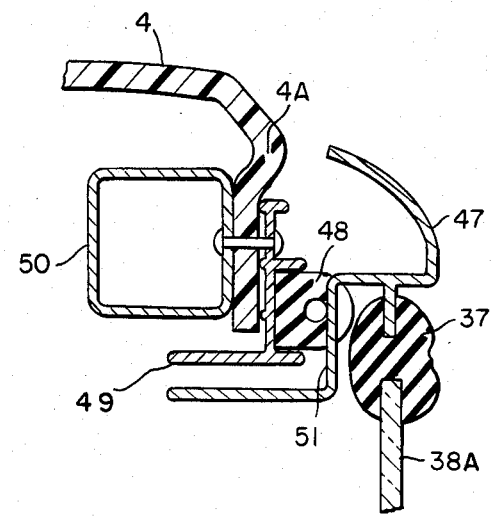
FIG. 6 is a partial sectional view taken along line VI—VI of FIG. 2.
Figure 7:
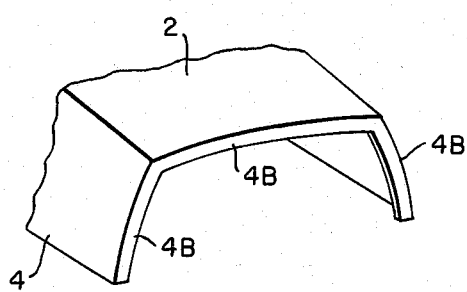
FIG. 7 is a front perspective view of a shell body constructed in accordance with the present invention, but without the sealing connection applied thereto.
Figure 8:
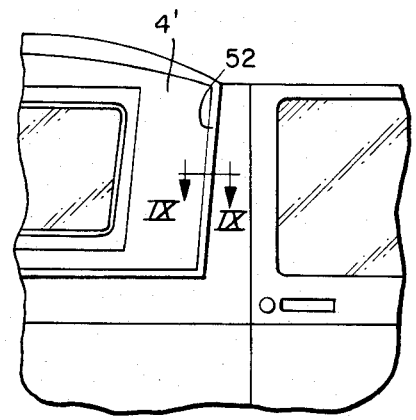
FIG. 8 is a partial enlarged side view showing the outward appearance of the cap and pick-up driver cab compression seal connction.

FIG. 6 illustrates the constructional arrangement at the side post of the rear door assembly. The elastic sealing connection 37 around the glass portion 38A extends along and is supported by profile member 47 extending vertically along the rear door 6 and movable therewith. Profile member 47 abuts profile member 38 and extrusion 30 at its lower and upper edges, respectively, to completely encase the door and serve as the door frame. A side sealing member 48 is supported by profile member 49, which is riveted through the inwardly angularly extending portion 4A of the sidewalls 4, 4' and sandwiched together with a rectangular hollowed tubular frame member 50. This profile 49 also serves to hold the side seal 48, which is engaged by the portion 51 of the profile member 47 when the door is in a closed position.

The rear door construction, illustrated and described above with respect to FIGS. 4-6 is especially advantageous in that it is light-weight, durable, and economical to manufacture. By the use of metal profile members, riveted together with the molded fiberglass shell body, which members also hold the fixed sealing parts, a reliable, economical to manufacture and durable construction results. Also, because of the use of the metal extruded parts, in combination with the decorative strip holding profiles and decorative strips, a very pleasing finished vehicle construction is provided for the assembled pick-up cap and pick-up truck box combination. Since all of the hinge and sealing mechanisms are hidden from view, both from within and without the vehicle, an especially pleasing appearance results.

The compression seal 52 between the cap and the outer rearward facing panel 1A of the driver cab is illustrated in FIGS. 8 to 10B. FIG. 7 shows the pick-up cap forward end, without the compression seal 52 in place.

The compression seal 52 includes a base portion 53 which is fixed by adhesive to the forward facing flange part 4B formed at the front opening of the cap shell body 2. This forwardly facing front opening extends substantially across the entire height and width of the shell body. Seal 52 is formed as a hollow profile member of elastomeric material with an opening 54 extending along its length. The sealing surface engageable with the rearward facing panel 1A of the driver cab is formed with a plurality of longitudinally extending sealing ribs 55. When in a relaxed non-use position, the opening 54 exhibits a circular shape (FIG. 10A), and when in an in-use position, opening 54 exhibits a flattened oval shape (FIG. 10B).

In preferred embodiments, the diameter of the opening 54 in the relaxed condition of seal member 52 is at least half the total height of the seal. With this arrangement, the seal member 52 can provide a continuous sealing contact and accommodate manufacturing tolerances of the cap and pick-up cab, as well as relative movement of the cab and cap during driving conditions. Since the seal member 52 is fixed permanently to the cap shell body 2, the establishment of the seal at the pick-up drivers cab, can be done simply by pressing the shell body 2 against the driver cab rear panel (with the hollow profile member 52 collapsing slightly to assure a sealing connection) and by connecting the hold down mechanisms for the shell body at the pick-up truck side walls. No adhesive or extra seal parts are required at the pick-up driver cab and the seal can be re-used as often as one wants to remove the cap shell body.

While I have shown and described a single embodiment in accordance with the present invention, it is understood that the same is not limited thereto but is susceptible to numerous changes and modifications as would be known to those skilled in the art of the present disclosure and I therefore do not wish to be limited to the details shown and described therein but intend to cover all such changes and modifications as are encompassed by the scope of the appended claims.

I claim:

1. Pick-up cap construction comprising:
   a shell body exhibiting a top and sidewalls extending downwardly therefrom,
   mounting rail means extending longitudinally along the respective inside bottom portions of said shell body sidewalls, said mounting rail means including a horizontally extending base member part and a shell body sidewall support part formed integrally therewith, said base member part being supportingly engageable with upwardly facing pick-up truck box sidewall means when said cap construction is in an in-use position on a pick-up, and said shell body sidewall support part being engagable underneath and along the inside of a shell body sidewall,
   trim holder means extending along the outside of the bottom portion of each of said shell body sidewalls, said trim holder means including an upwardly facing portion engagable under the respective sidewall and in facing relationship to said shell body sidewall support part, said trim holder means including a profile shape for interlockingly holding a decorative trim piece, and
   connecting means extending through said trim holder means, sidewall, and shell body sidewall support to clampingly and fixedly hold the same together.

2. Pick-up cap construction according to claim 1, further comprising decorative trim means inserted into said trim holder means, said trim means being disposed to conceal said connecting means and the connection of the shell body sidewalls and the pick-up truck box sidewalls from the outside.

3. Pick-up cap construction according to claim 2, wherein said connecting means includes rivet means.

4. Pick-up cap construction according to claim 3, wherein said mounting rail means is configured to conceal the connecting means with respect to the inside of the shell body.

5. Pick-up cap construction according to claim 4, wherein said trim holder means exhibits a profile which is covered by said trim means.

6. Pick-up cap construction according to claim 1, wherein said shell body has a rearwardly facing rear opening extending substantially over the entire width and height of the shell body, and further comprising a rear door movably supported by hinge means at the shell body to open and close said rear opening, said hinge means being located at the top of said rear opening and exhibiting a horizontally extending hinge axis, said rear door having a height corresponding to the combined height of said shell body sidewalls and the pick-up truck box sidewalls, whereby the rear door selectively covers the entire rear opening of the cap and pick-up box from the floor of the pick-up box to the top of the shell body.

7. Pick-up cap construction according to claim 6, further comprising a rear door trim holder member attached to the rear of the rear door and exhibiting a trim holding profile shape corresponding to the sidewall trim holder means, whereby corresponding trim means can be applied across the rear of the door at the height of the trim means located on the shell body and pick-up truck box sidewalls.

8. Pick-up cap construction according to claim 1, wherein said shell body exhibits a forwardly facing front opening engagable with a rearward side of a pick-up driver cab, said front opening extending across substantially the entire height and width of the shell body, and further comprising compressible elastic seal means surrounding said front opening and being compressibly engagable against the rearward side of the pick-up driver cab to sealingly close the space between said shell body and the pick-up cab.

9. Pick-up cap construction according to claim 8, wherein said shell body has a rearwardly facing rear opening extending substantially over the entire width and height of the shell body, and further comprising a rear door movably supported by hinge means at the shell body to open and close said rear opening, said hinge means being located at the top of said rear opening and exhibiting a horizontally extending hinge axis, said rear door having a height corresponding to the combined height of said shell body sidewalls and the pick-up truck box sidewalls, whereby the rear door selectively covers the entire rear opening of the cap and pick-up box from the floor of the pick-up box to the top of the shell body.

10. Pick-up cap construction according to claim 9, further comprising a rear door trim holder member attached to the rear of the rear door and exhibiting a trim holding profile shape corresponding to the sidewall trim holder means, whereby corresponding trim means can be applied across the rear of the door at the height of the trim means located on the shell body and pick-up truck box sidewalls.

11. Pick-up cap construction according to claim 8, wherein holddown means are provided for holding the base member part of the mounting rail means against said pick-up truck box sidewalls to hold the pick-up cap in position with said compressible elastic seal means compressibly engaged against the rearward side of the pick-up driver cab.

* * * * *